Nov. 11, 1930.  E. H. DELLING  1,781,322
AUTOMOTIVE VEHICLE
Filed Jan. 17, 1929   2 Sheets-Sheet 2
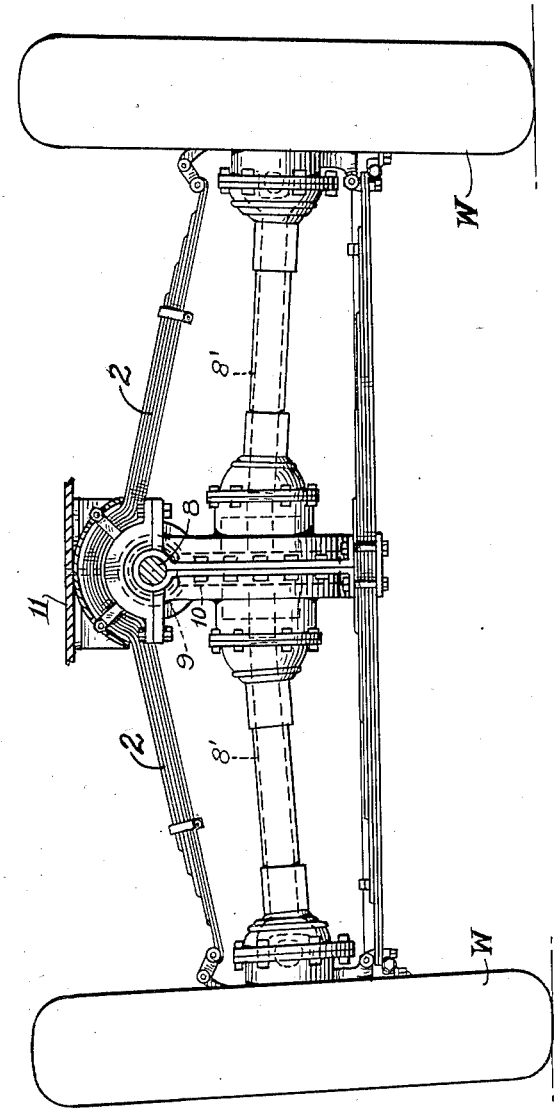
Inventor
E. H. Delling
By Mason Fenwick Lawrence
Attorneys Patented Nov. 11, 1930

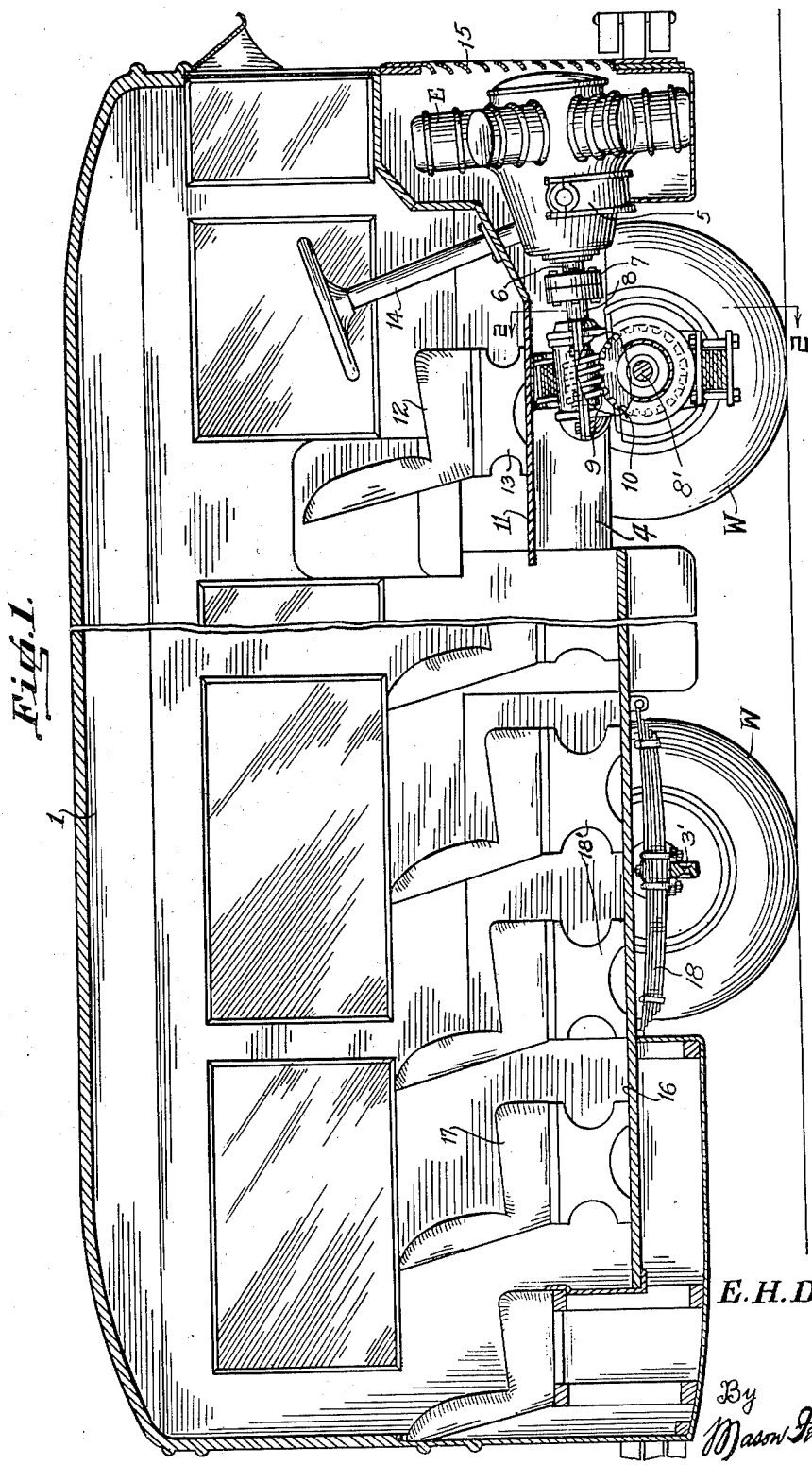

1,781,322

UNITED STATES PATENT OFFICE

ERIK H. DELLING, OF SNYDER, NEW YORK, ASSIGNOR TO SUPERSTEAM PRODUCTS, INC., A CORPORATION OF DELAWARE

AUTOMOTIVE VEHICLE

Application filed January 17, 1929. Serial No. 333,143.

This invention relates to automotive vehicles in general, and particularly to vehicles of the passenger bus, truck or moving van type.

The object of the invention is to provide a vehicle of this general type in which the engine hood, which ordinarily extends in front of the vehicle body proper, is eliminated; and in which the space ordinarily occupied by the engine is utilized to accommodate the driver.

Another object of the invention is to provide a vehicle of this general type in which the shortest type of engine, for example, the radial engine, is mounted in front of the front axle of the vehicle; and, in which the drive is effected by any suitable drive connecting the engine with the front axle.

A further object of the invention is to provide a vehicle of this type in which the engine is mounted so as to be very accessible for adjustment, replacement or repair.

A still further object of the invention is to provide a vehicle of this general type with a dead drop center rear axle, in order to bring the floor of the vehicle much nearer to the ground than is customary with vehicles of the prior art, and thereby to lower the overall height of the vehicle body without lessening the distance between the floor and the ceiling of the body. This low floor greatly facilitates entrance and exit in case of a bus, and makes for easy loading in case of a moving van or truck.

Another object of this invention is to provide a vehicle of this general type in which the body is substantially lower than bodies of similar vehicles of the prior art, in order to lower the center of gravity of the vehicle and to lessen its liability to turn over in case of accident or skid.

Another object of this invention is to overcome the serious trouble of torsional vibration of the long propeller shafts that are necessary to reach the rear axle in the conventional designs.

Still another object of the invention is to provide a vehicle of this general type in which many elements of the prior art vehicles are eliminated, and thereby to reduce the cost of manufacture of this particular type of vehicle.

Other objects of the invention will appear as the detailed description thereof proceeds.

In the drawings:

Figure 1 shows in a broken central longitudinal vertical section the arrangement of the several elements constituting this invention; and Figure 2 is a vertical section on the line 2—2 of Figure 1.

In the drawings the reference numeral 1 designates the vehicle body suitably framed and supported by transverse front springs 2 and rear springs 18 mounted on a drop center wheel supported rear axle 3'.

The engine employed in this invention is of the type having a bank of radial cylinders and operated by gas or steam. This engine E is suitably supported by the framework 4, extending from body 1 by means of a cradle 5 extending under the engine E and connected at its opposite ends to the framework 4 in any suitable manner. The drive shaft 6 of the engine is split and connected by any of the well known type of flexible coupling 7 to a short driven shaft 8, which by any customary wheel drive is connected to the axles 8' to rotate the latter.

As shown in the drawings the driven shaft 8 has a worm 9 secured thereto and in mesh with a worm gear 10, suitably connected to the front wheels W by two shafts 8'. This illustration of engine, engine support and driving mechanism is wholly conventional, and is not to be taken as in any way limiting this invention to the particular construction shown in the drawing. The essential feature of this invention resides in the arrangement of the radial, multi-cylinder engine E in front of the front axle and in driving this axle from said engine, thereby making a much lower floor possible without any rise whatever.

The peculiar type of engine used in this invention and its arrangements relative to the front driving wheel thereof make it possible to provide a driver's seat substantially vertically over the front axle, and thereby to utilize all the space vertically above the engine and drive axle as a driver's cab. The floor of the driver's cab is designated generally by the reference numeral 11, and the driver's seat 12 is suitably supported on the floor 11 by a standard 13, and in position for convenient manipulation by the driver of the steering rod 14 connected in any suitable manner to control the steering operations of the front wheel.

The driver's cab arrangement in this vehicle forms an enclosing structure in which the floor constitutes a partition defining a driver's compartment above, and an engine housing below, the front wall of said enclosing structure being in a plane directly in front of the engine. That part of the front wall which forms a part of the engine housing may be provided with air inlet louvers 15 for the admission of cooling air to the engine E. This arrangement, obviously, provides great visibility for the driver of the road conditions immediately in front of the vehicle; and by shortening the drive connection between the steering rod 14 and the gearing controlling the steering of the front wheels W greatly facilitates the control by the driver of the movements of the vehicle.

Because of the drop center of the rear axle 3, a very low position of the floor 16 of the main body of the bus is rendered possible; and this, in turn, adds greatly to the safety of operation of this large type of motor vehicle. The seats 17 may have any convenient arrangement along the floor 16 and be supported by standards 18' suitably secured to the floor 16.

As will be obvious from the preceding disclosure, the front wheel drive with the dead rear axle is much cheaper to manufacture than any of the usual type of rear axle drive motor vehicles, since this construction eliminates the usual two propeller shafts, intermediate bearings and hangers for same, and employs a simple dead rear axle. It is also obvious that this construction provides a chassis which is much cleaner in general appearance than the usual type of bus chassis, and obviously is much cheaper to manufacture.

Torsional vibration is successfully eliminated by the shortness of all driving members.

What I claim is:

In a motor vehicle, in combination with front wheel driving mechanism including an axle, an engine having its crank shaft arranged substantially in the median longitudinal vertical plane of said vehicle and having a bank of cylinders of that type in which the cylinders all are intersected by a single plane perpendicular to the axis of rotation of the engine crank shaft, means supporting said engine with its cylinders forwardly of said axle, a cab forming an enclosing structure defining a driver's compartment and an engine housing, the foremost wall of which enclosing structure is directly forward of said engine, said enclosing structure including a floor positioned in a plane above said axle and intersecting said engine, and a driver's seat above said floor and rearwardly of said bank of cylinders.

In testimony whereof I affix my signature.

ERIK H. DELLING.